(12) United States Patent
Oakley et al.

(10) Patent No.: US 8,913,273 B2
(45) Date of Patent: Dec. 16, 2014

(54) WORKFLOW TO ALLOW CONTINUED PRINTING IN PRESENCE OF SEVERE PRINTER ERROR

(71) Applicant: Xerox Corporation, Norwalk, CT (US)

(72) Inventors: Mark Oakley, Cambridgeshire (GB); Martin Young, Hertfordshire (GB); Paul Hewitt, Kent (GB); Neil J. Harrop, Essex (GB)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/874,511

(22) Filed: May 1, 2013

(65) Prior Publication Data

US 2014/0327924 A1 Nov. 6, 2014

(51) Int. Cl.
*G06F 15/00* (2006.01)
*G06F 3/12* (2006.01)
*G06K 1/00* (2006.01)
*G06K 15/00* (2006.01)

(52) U.S. Cl.
CPC .............. *G06F 3/121* (2013.01); *G06F 3/1234* (2013.01); *G06K 15/005* (2013.01)
USPC ......................................... 358/1.14; 358/1.13

(58) Field of Classification Search
CPC ...... G06F 3/121; G06F 3/1234; G06K 15/005
USPC ................................. 358/1.14, 1.15, 1.13, 1.1
See application file for complete search history.

(56) References Cited

U.S. PATENT DOCUMENTS

| | | | |
|---|---|---|---|
| 5,028,953 A * | 7/1991 | Katoh et al. | 355/403 |
| 5,080,348 A | 1/1992 | Pendell et al. | |
| 5,457,524 A | 10/1995 | Metcalf et al. | |
| 5,730,535 A | 3/1998 | Keller et al. | |
| 6,032,004 A | 2/2000 | Mirabella, Jr. et al. | |
| 7,072,610 B2 | 7/2006 | Nakane | |
| 7,756,428 B2 * | 7/2010 | Anderson et al. | 399/16 |
| 8,200,140 B2 | 6/2012 | Tyson et al. | |

FOREIGN PATENT DOCUMENTS

EP 0562721 A3 2/1993

* cited by examiner

*Primary Examiner* — Douglas Tran
(74) *Attorney, Agent, or Firm* — Gibb & Riley, LLC

(57) ABSTRACT

Exemplary apparatuses herein comprise, for example, a printing apparatus that includes processing elements, such as printing elements, a media path positioned to supply sheets of media to the printing elements, a media storage device maintaining the sheets of media and providing the sheets of media to the media path, a processor device operatively connected to the media storage device and the media path, and a graphic user interface operatively connected to the processor device. The processor device monitors operations of the media storage device and the media path to detect media path faults. The processor device evaluates the media path faults to determine the severity of the media path faults. The processor device performs the bypass operation based on a combination of at least one of the media path faults exceeding a previously established severity level and the user-selectable bypass option on the graphic user interface being selected.

24 Claims, 4 Drawing Sheets

WORKFLOW TO ALLOW CONTINUED PRINTING IN PRESENCE OF SEVERE PRINTER ERROR

BACKGROUND

Systems and methods herein generally relate to printer devices and methods, and more particularly to systems and methods that allow continued printing in presence of severe printer errors.

Conventional printing devices do not possess the intelligence to advise the user on alternative workflows that can allow the user to output their urgent print work when normal printing operations cannot be completed because of printer faults. For example, when a printing device experiences failures that prevent the feeding of print media through the print path specified by the print job, the printing device may still have the capability to print a job by having the user take certain action, such as using an alternative route for the paper to pass through the machine to obtain their urgent or emergency work. However, conventional printing devices do not advise users of any such emergency alternatives.

SUMMARY

Exemplary apparatuses herein comprise, for example, a printing device that includes processing elements, such as printing elements that place marks on sheets of media, media paths positioned to supply such sheets of media to the printing elements, a media storage device maintaining the sheets of media and providing the sheets of media to the media path, a processor device operatively connected to the media storage device and the media path, and a graphic user interface operatively connected to the processor device. The processor device monitors operations of the media storage device and the media path to detect media path faults. The processor device evaluates the media path faults to determine the severity of the media path faults. The graphic user interface includes a user-selectable bypass option to perform a bypass operation when one or more of the media path faults exceed a previously established severity level.

The processor device performs a bypass operation only when one or more of the media path faults exceed the previously established severity level and the user-selectable bypass option is selected. This bypass operation can be, for example, the graphic user interface providing user instructions and/or the processor device changing a path selection within the media path. Media path faults that exceed the previously established severity level are those that are correctable by a permanent component of the printing apparatus being replaced and/or an action by a trained service individual; while media path faults that do not exceed the previously established severity level include media path faults that are correctable by a consumable component of the printing apparatus being replaced and/or action by an untrained user.

Various methods herein monitor operations of a media storage device and media paths of an apparatus (such as a printing apparatus) using a processor device of the apparatus to detect media path faults. The media storage device maintains sheets of media and provides the sheets of media to the media path. The media paths are positioned to supply sheets of media to processing elements of the apparatus. Such methods evaluate the media path faults to determine the severity or chronic nature of each of the media path faults using the processor device. Further, the methods provide a user-selectable bypass option to perform a bypass operation when one or more of the media path faults exceed a previously established severity level, and the user-selectable bypass option is provided on a graphic user interface of the apparatus.

These methods perform the bypass operation using the processor device only when at least one of the media path faults exceeds the previously established severity level and the user-selectable bypass option is selected. The bypass operation comprises, for example, the graphic user interface providing user instructions to manually use a bypass media path and/or the processor device automatically changing a path selection to use a different media path or media path portion that is not experiencing media path faults that exceed the previously established severity level.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

Figure 1:
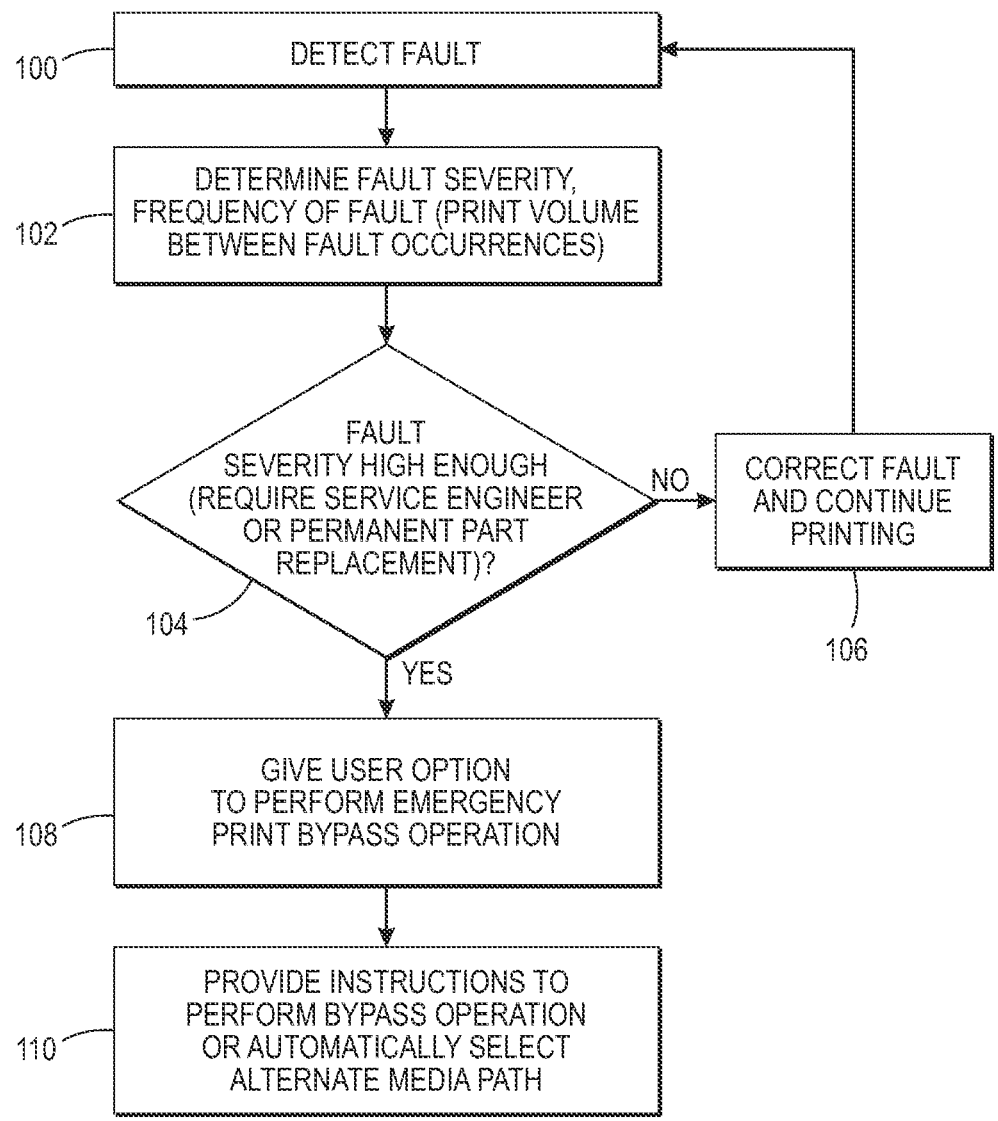
FIG. 1 is a flow diagram of various methods herein.

As mentioned above, conventional printing devices do not advise users of alternatives (such as using an alternative route for the paper to pass through the machine) when a printing device may still have the capability to print a job, even in the presence of a substantial fault that requires part replacement or a service engineer call. Therefore, the systems and methods herein provide an alternative paper path feed either automatically, or provide instructions at the user interface for the user to change the settings of the printing device so as to, for example, route sheets from an external bypass tray to an output tray. Thus, systems and methods herein provide a workflow that instructs the user to reprogram the job properties through the user interface of the printing device, for example, to transfer the correct paper size/type from the original tray into a bypass module and resume the job.

As shown in the flowchart in FIG. 1, modern printing devices have sensors that detect faults, such as paper jams, non-functioning elements, printing quality being below acceptable standards, etc. Further, printing machines record failure mode statistics within log data records in onboard memory. Therefore, as shown in item 102, the systems and methods herein determine the fault severity by looking at the frequency of a given failure mode over a time period or printing period (e.g., print volume between fault occurrences)

In item 104, these systems and methods evaluate if the current fault is severe or chronic enough to require permanent part replacement (as opposed to consumable part replacement) or trained repair personnel assistance. If the fault does not arise to this level of severity, the user can be advised to take some action (clear a paper jam, replace a consumable, etc.) and continue printing in item 106.

In the event this fault has a high enough severity, the user is presented with an option (e.g., an "Emergency Print Option" button) on the printer user interface to activate bypass workflow processing, as shown in item 108. If this option is chosen by the user, the systems and methods herein advise the user to take specific action so that printing can occur (until the trained repair personnel can make the appropriate repair) as shown in item 110.

In one example of item 110, the systems and methods herein can present a workflow to the user through the user interface of the printing device to transfer paper from the tray originally specified by the print job to another tray or input (e.g., bypass module input) and to select various printer menu options so that the original print job can be completed while the user is still present at the printer.

In addition, after the user performs the workflow, the user interface can remind the user that the repair still needs to be made, using message such as "Please ensure you call for service to address the fault." Thus, with systems and methods herein, users can still print, even in the face of severe or chronic printer faults, and the systems and methods herein avoid requiring the user to return to their desk to re-submit their job to an alternative printer.

Thus, FIG. 1 illustrates that the systems and methods herein monitor operations of a print media storage device and print media paths of an apparatus (such as a printing apparatus) using a processor device of the apparatus to detect sheet movement faults or other faults of the media path (100). The media storage device (e.g., paper tray) maintains sheets of media and provides the sheets of media to the media path (e.g., paper path). The media path is positioned to supply sheets of media to processing elements (e.g., printing elements, cutting elements, folding elements, etc.) of the apparatus.

Such methods evaluate the media path faults to determine the severity of each of the media path faults using the processor device in item 102. For example, if the media path fault is a paper jam that occurs relatively infrequently, or a consumable (ink supply, toner cartridge, etc.) needing replacement, such faults may not reach a severity to allow the utilization of bypass processing. However, if the paper jam occurs at a high frequency (more than 10% of the time, for example) or if the consumable has been recently replaced (only used 25% of the expected consumable lifetime) this can indicate that the media path fault is chronic and, therefore, is severity enough to provide the emergency bypass feature to the user.

The severity level can be measured (in item 102) numerically, by assigning certain faults numerical values based upon their importance or their frequency of occurrence, and this numerical value can be compared against a standard to determine whether the media path fault severity exceeds a predetermined level (such as a predetermined fault severity maximum or predetermined fault severity threshold).

Similarly, the media path faults can be classified into different classes in item 102 to determine whether the media path faults exceed the predetermined fault maximum threshold. For example, in one classification, media path faults that exceed the previously established severity level can be those that are correctable only by a permanent component of the printing apparatus being replaced and/or an action by a trained service individual. In another classification, media path faults that do not exceed the previously established severity level include media path faults that are correctable by a consumable component of the printing apparatus being replaced and/or action by an untrained user. Additionally, media path faults that do not exceed the previously established severity level could be reclassified if they occur above a specific frequency and are therefore chronic faults. Thus, once a fault is classified as a chronic fault because it occurs above a predetermined frequency, the otherwise user-serviceable fault can be considered severe and would need to be resolved only by a trained service individual.

Therefore, the systems and methods herein can classify what would otherwise be a routine user-serviceable error (such as paper jam) as a severe error if the fault is chronic (meaning it occurs above a predetermined frequency). By observing the error frequency, the systems and methods herein can make the determination that the fault is occurring frequently enough that a trained service engineer should analyze the fault. Further, by identifying the fault as a chronic fault, the printing device makes a decision that additional processing through the path where the chronic fault exists should not continue because there is a high likelihood that the processing will not be successful (e.g., if the path where the fault exists is utilized, there will most likely (e.g., determined on a percentage or other basis) be a paper jam).

Further, this determination of whether to utilize a specific media path can be made dependent upon characteristics of the print job. For example, if the printing device has determined that paper jam occurs approximately every 100 prints or only occurs when print jobs are larger than 100 prints, etc., the printing device can analyze the print job to determine how many prints are required. If a very low number of prints relative to the frequency of fault occurrence (e.g., less than 25%) the printing device can allow the print job to continue as originally intended. Therefore, if the print job had less than 25 sheets, it may be allowed to proceed (if print jams have only historically occurred with print jobs over 100 sheets).

Again, in item 108, the methods and systems herein provide the user-selectable bypass option to perform a bypass operation only when one or more of the media path faults exceeds a previously established severity level. The user-selectable bypass option is provided on a graphic user interface of the apparatus. Thus, these methods perform the bypass operation using the processor device only when at least one of the media path faults exceeds a previously established severity level and the user-selectable bypass option is selected.

The bypass operation in item 110 comprises, in one example, the graphic user interface providing user instructions to manually use a bypass media path. Alternatively, the processor device can automatically change the path selection by automatically closing or opening gates within the media path, so as to automatically use a media path or portion of a media path that is not experiencing media path faults (or at least not experiencing faults that exceed the previously established severity level).

Figure 2:
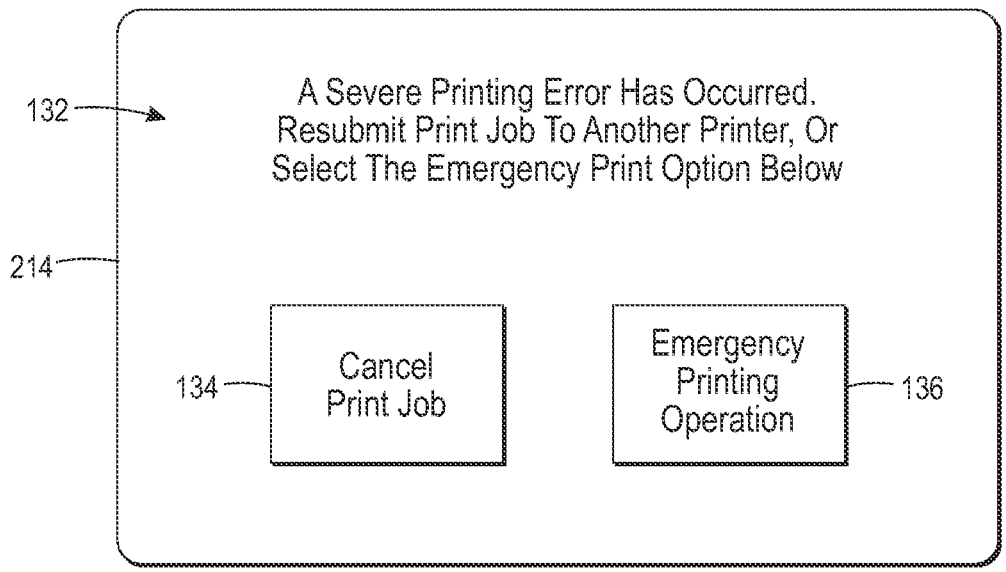
FIG. 2 is a schematic diagram illustrating a screenshot according to systems and methods herein.
Figure 3:
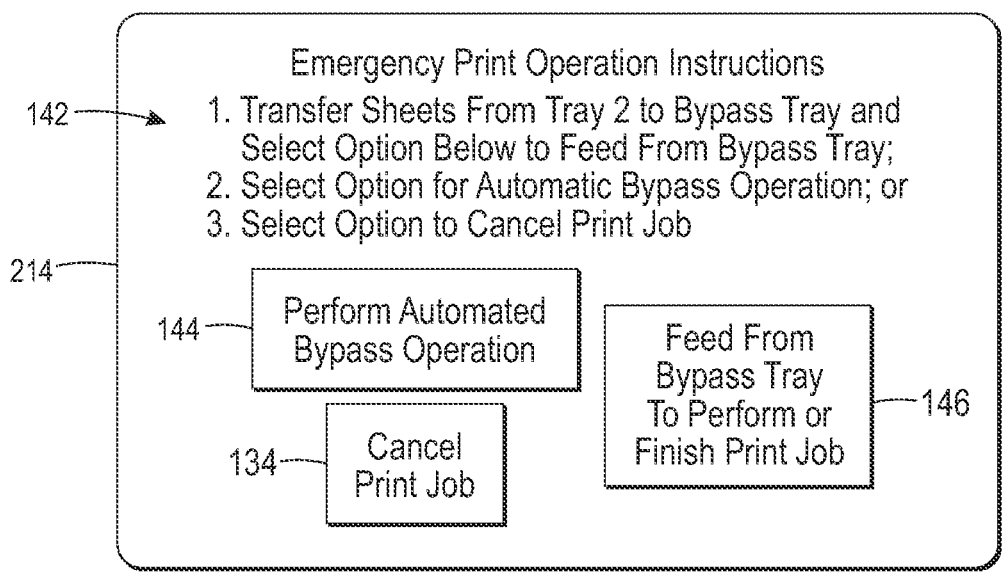
FIG. 3 is a schematic diagram illustrating a screenshot according to systems and methods herein.

FIGS. 2 and 3 illustrate exemplary screenshots that could be presented on the graphic user interface 214 (discussed in greater detail below) of the printing device using systems and methods herein. More specifically, in FIG. 2, when the severity of a printer fault exceeds the previously established severity level, the graphic user interface 214 displays a message 132 to the user that a severe printing error has occurred. This message 132 instructs the user to either resubmit the print job to another printer, or to select an emergency print option button 136. As shown in FIG. 2, the user is presented with a button 134 whereby they can cancel the print job, return to their computer, and resubmit the print job to a different printing device. The menu selections (option buttons) 134, 136 shown in FIG. 2 can be executed by pressing a touchscreen, pressing hard buttons adjacent the screen, utilizing a cursor control device, providing voice commands, etc., depending upon the capabilities of the graphic user interface 214.

Alternatively, if the user selects the emergency printing operation button 136, they can be presented with one or more additional instruction screens on the graphic user interface 214, such as the screenshot shown in FIG. 3. In the example shown in FIG. 3, the user is provided various instructions 142. In this example, the instructions 142 give the user the choice to transfer sheets from one of the existing trays to the bypass tray, to perform fully automatic bypass operations, or to cancel the print job. The user can indicate their choice by selecting from a menu selection button 144 to perform a fully automated bypass operation, menu selection button 134 to cancel the print job, or menu selection button 146 to utilize the bypass tray to perform or finish the print job. Selection of button 146 automatically changes the print job settings within the printer to call for sheets from the bypass tray (or some other media supply location). Further, selection of button 146 it the only action the user needs to take to change the print job settings within the printer, which avoids the need for the user to go back into the print job creation operation to change print job settings, as would be required conventionally. This allows the user to complete the print job at the printer, even in the presence of a severe printer error.

The automated bypass operation 144 menu selection option button will only be presented if, based upon the processor detecting an available paper path that is not experiencing a severe error, the processor determines that it can automatically change settings within the printing device to automatically utilize an alternative paper path. Sometimes the automated bypass operation 144 will deviate from the originally intended print job settings and will print using the incorrect paper size or type, or may print in black and white instead of color, etc. The user can be provided with notification that utilization of the automated bypass operation 144 will cause such specific deviations from the originally intended print job, to allow the user to decide whether to use the fully automated bypass operation 144.

Further, as indicated in menu selection button 146, the entire print job can be completed through the emergency print operation or, if a portion of the print job was already completed before the severe error occurred, the emergency print operation can be utilized to finish the remaining portion of the print job.

Those ordinarily skilled in the art would understand that the various instructions and menu options presented in FIGS. 2 and 3 are merely examples to provide a better understanding of the methods and systems herein. Many different forms of instructions and menu options can be presented, and these different forms may be dictated by the capabilities of the graphic user interface 214 and/or the printing device itself.

Figure 4:
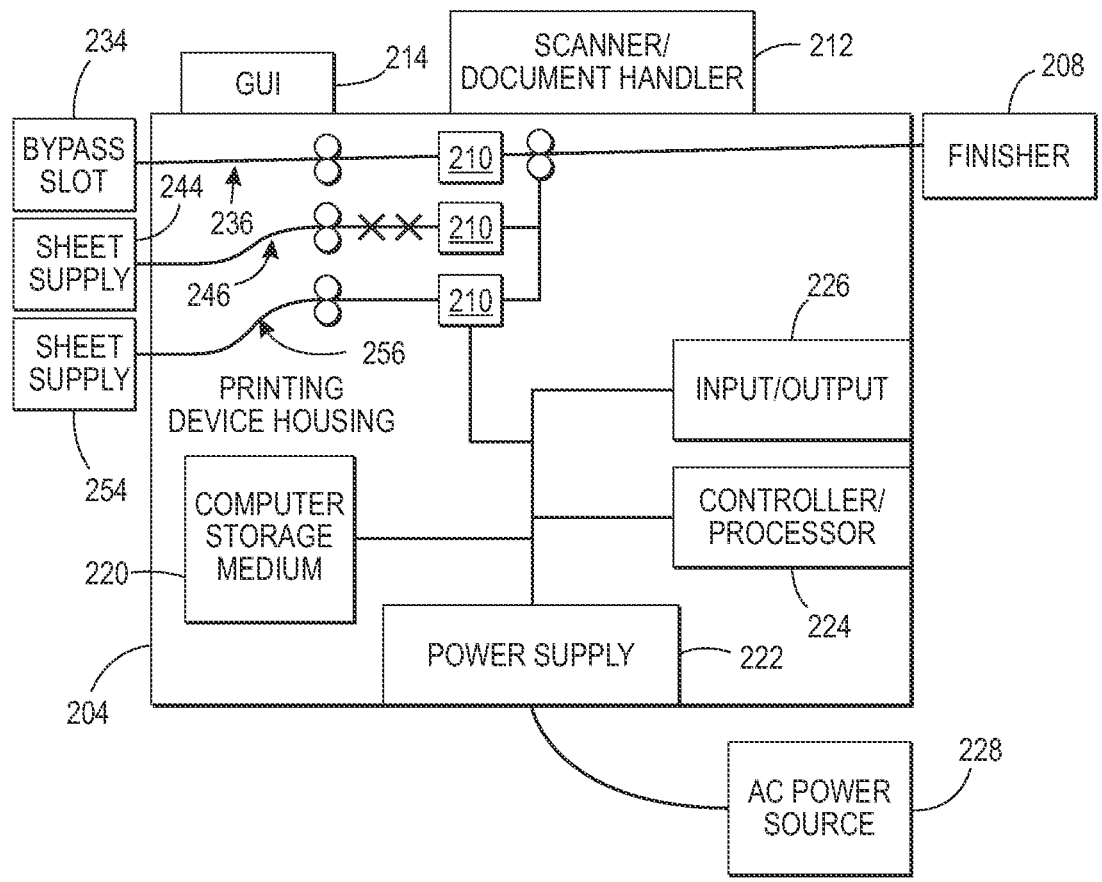
FIG. 4 is a schematic diagram illustrating devices herein.

FIG. 4 illustrates a computerized device that is a printing device 204, which can be used with systems and methods herein and can comprise, for example, a printer, copier, multi-function machine, multi-function device (MFD), etc. The printing device 204 includes a controller/processor 224 and a communications port (input/output) 226 operatively connected to the processor 224 and to the computerized network 202 external to the computerized device 200. Also, the printing device 204 can include at least one accessory functional component, such as a graphic user interface assembly 214 that also operate on the power supplied from the external power source 228 (through the power supply 222).

The input/output device 226 is used for communications to and from the computerized device 200. The processor 224 controls the various actions of the computerized device. A non-transitory computer storage medium device 220 (which can be optical, magnetic, capacitor based, etc.) is readable by the processor 224 and stores instructions that the processor 224 executes to allow the computerized device to perform its various functions, such as those described herein. Thus, as shown in FIG. 4, a body housing 204 has one or more functional components that operate on power supplied from the alternating current (AC) 228 by the power supply 222. The power supply 222 can comprise a power storage element (e.g., a battery) and connects to an external alternating current power source 228 and converts the external power into the type of power needed by the various components.

The printing device 204 also includes at least one marking device (printing engines) 210 operatively connected to the processor 224, media paths 236, 246, 256 positioned to supply sheets of media from a bypass tray 234 or sheet supplies 244, 254 to the marking device(s) 210, etc. After receiving various markings from the printing engine(s), the sheets of media can optionally pass to a finisher 208 which can output, fold, staple, sort, etc., the various printed sheets. Also, the printing device 204 can include at least one accessory functional component (such as a scanner/document handler 212, etc.) that also operates on the power supplied from the external power source 228 (through the power supply 222).

Thus, the exemplary apparatuses herein comprise, for example, a printing apparatus 204 that includes processing elements 210, such as printing elements 210 that place marks on sheets of media, media paths 236, 246, 256 positioned to supply such sheets of media to the printing elements 210, a media storage devices 244, 254 maintaining the sheets of media and providing the sheets of media to the media path, a processor device 224 operatively connected to the media storage devices 244, 254 and the media path 236, 246, 256, and a graphic user interface 214 operatively connected to the processor 224. The processor device 224 monitors operations of the media storage devices 244, 254 and the media paths 236, 246, 256 to detect media path faults.

The processor device 224 evaluates the media path faults to determine the severity of the media path faults. The graphic user interface 214 provides a user-selectable bypass option to perform a bypass operation when one or more of the media path faults exceed a previously established severity level. The processor device 224 performs a bypass operation only when one or more of the media path faults exceed a previously established severity level and the user-selectable bypass option is selected.

This bypass operation can be, for example, the graphic user interface 214 providing user instructions and/or the processor device 224 changing a media path selection. For example, a user's print job may require the media type maintained in the sheet supply 244; however, a sufficiently severe media path fault may be located in media path 246 (as represented by X's in FIG. 4). This media path fault can be a problem with the sheet supply 244, portions of the media path 246, or the printing engine 210 included within media path 246. The severity of the media path fault would be determined as discussed above.

In this situation, the graphic user interface 214 could simply provide a notice to the user to return to their workstation to resubmit the print job to a different printer. However, this would inconvenience the user, and might create an emergency situation for the user if they needed the print job to be completed very quickly (e.g., for a meeting occurring in 5 min.). Therefore, the systems and methods herein provide a bypass print or emergency print option on the graphic user interface (shown in FIGS. 2-3, above) when one or more of the media path faults exceeds a previously established severity level within the media path that is required by the print job (including faults in elements such as sheets supply 244, media path 246, and associated print engine 210).

When the user selects the bypass print option, the graphic user interface 214 could advise the user to move the sheets of media from sheet supply 244 to the bypass tray 234 (or to tray 254), and provide the user an option to process the currently pending print job along media path 236. Similarly, the graphic user interface could advise the user to move the sheets of media from sheet supply 244 to sheet supply 254, and provide the user an option to process the currently pending print job along media path 256. In another alternative, if the user selects the emergency print or bypass print option, the graphic user interface could simply automatically process the print job from whatever sheets are currently available within sheet supply 254 and using whatever printing engines 210 were functioning and accessible, without requiring the user to take any additional steps or actions. The above are some limited examples of alternatives available under the bypass print option; however, those ordinarily skilled in the art would understand that many other options for rerouting along different media paths could be provided to the user, depending upon the complexity and flexibility of the printing device 204 itself.

Figure 5:
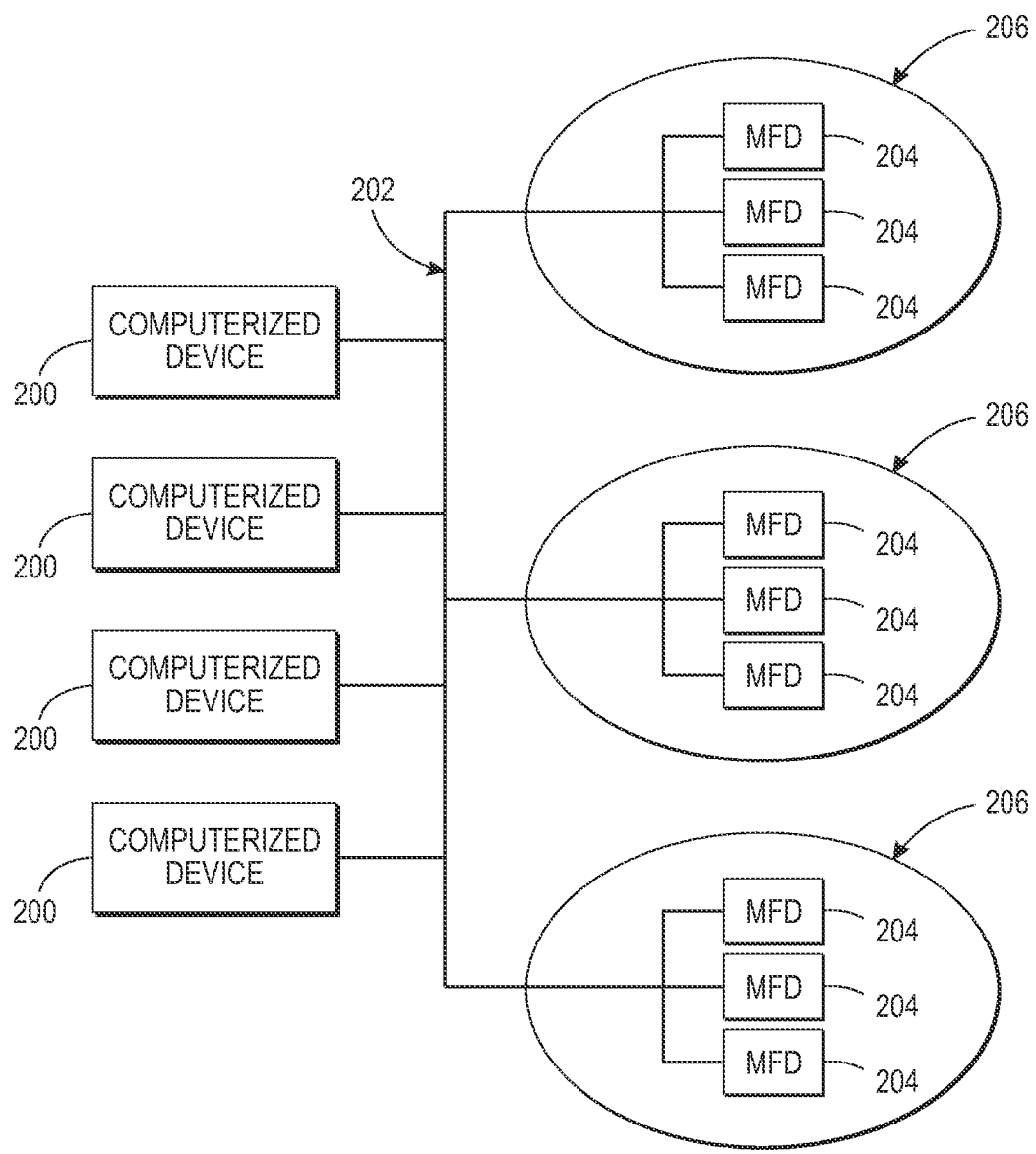
FIG. 5 is a schematic diagram illustrating systems herein.

FIG. 5 illustrates various exemplary system systems and methods herein include various computerized devices 200 and printing devices 204 located at various different physical locations 206. The computerized devices 200 can include print servers, personal computers, etc., and are in communication (operatively connected to one another) by way of a local or wide area (wired or wireless) network 202. Further, the instructions provided on the graphic user interface 214 of the various printing devices 204 can be generated from the processors 224 of the printing devices 204 themselves, or such bypass options and instructions can be generated from remote computerized devices 200 (which would cause the printing devices 204 to display such options and instructions).

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. An apparatus comprising:
   processing elements;
   a media path positioned to supply sheets of media to said processing elements;
   a media storage device maintaining said sheets of media and providing said sheets of media to said media path;
   a processor device operatively connected to said media storage device and said media path; and
   a graphic user interface operatively connected to said processor device,
   said processor device monitoring operations of said media storage device and said media path to detect media path faults,
   said processor device evaluating said media path faults to determine a severity of said media path faults,
   said graphic user interface including a user-selectable bypass option to perform a bypass operation based on at least one of said media path faults exceeding a previously established severity level, and
   said processor device performing said bypass operation based on and said user-selectable bypass option being selected.

2. The apparatus according to claim 1, said processor device performing said bypass operation only if said at least one of said media path faults exceeds said previously established severity and said user-selectable bypass option is selected.

3. The apparatus according to claim 1, said bypass operation comprising at least one of: said graphic user interface providing user instructions; and said processor device changing a path selection within said media path.

4. The apparatus according to claim 1, said media path faults exceeding said previously established severity level comprising media path faults correctable by at least one of: a permanent component of said apparatus being replaced; and action by a trained service individual.

5. The apparatus according to claim 1, said media path faults not exceeding said previously established severity level comprising media path faults correctable by at least one of: a consumable component of said apparatus being replaced; and action by an untrained user.

6. The apparatus according to claim 1, said processing elements changing characteristics of said sheets of media.

7. A printing apparatus comprising:
   printing elements;
   a media path positioned to supply sheets of media to said printing elements;
   a media storage device maintaining said sheets of media and providing said sheets of media to said media path;
   a processor device operatively connected to said media storage device and said media path; and a graphic user interface operatively connected to said processor device, said processor device monitoring operations of said media storage device and said media path to detect media path faults, said processor device evaluating said media path faults to determine a severity of said media path faults, said graphic user interface including a user-selectable bypass option to perform a bypass operation based on at least one of said media path faults exceeding a previously established severity level, and said processor device performing said bypass operation based on a combination of said at least one of said media path faults exceeding a previously established severity level and said user-selectable bypass option being selected.

8. The printing apparatus according to claim 7, said processor device performing said bypass operation only if said at least one of said media path faults exceeds said previously established severity and said user-selectable bypass option is selected.

9. The printing apparatus according to claim 7, said bypass operation comprising at least one of: said graphic user interface providing user instructions; and said processor device changing a path selection within said media path.

10. The printing apparatus according to claim 7, said media path faults exceeding said previously established severity level comprising media path faults correctable by at least one of: a permanent component of said printing apparatus being replaced; and action by a trained service individual.

11. The printing apparatus according to claim 7, said media path faults not exceeding said previously established severity level comprising media path faults correctable by at least one of: a consumable component of said printing apparatus being replaced; and action by an untrained user.

12. The printing apparatus according to claim 7, said printing elements placing marks on said sheets of media.

13. A method comprising:

monitoring operations of a media storage device and a media path of an apparatus using a processor device of said apparatus to detect media path faults, said media storage device maintaining sheets of media and providing said sheets of media to said media path, said media path being positioned to supply sheets of media to processing elements of said apparatus;

evaluating said media path faults to determine a severity of said media path faults using said processor device;

providing a user-selectable bypass option to perform a bypass operation based on at least one of said media path faults exceeding a previously established severity level, said user-selectable bypass option being provided on a graphic user interface of said apparatus; and performing said bypass operation using said processor device based on a combination of said at least one of said media path faults exceeding a previously established severity level and said user-selectable bypass option being selected.

14. The method according to claim 13, said bypass operation being performed only if said at least one of said media path faults exceeds said previously established severity and said user-selectable bypass option is selected.

15. The method according to claim 13, said bypass operation comprising at least one of: said graphic user interface providing user instructions; and said processor device changing a path selection within said media path.

16. The method according to claim 13, said media path faults exceeding said previously established severity level comprising media path faults correctable by at least one of: a permanent component of said apparatus being replaced; and action by a trained service individual.

17. The method according to claim 13, said media path faults not exceeding said previously established severity level comprising media path faults correctable by at least one of: a consumable component of said apparatus being replaced; and action by an untrained user.

18. The method according to claim 13, said processing elements changing characteristics of said sheets of media.

19. A method comprising:

monitoring operations of a media storage device and a media path of a printing apparatus using a processor device of said printing apparatus to detect media path faults, said media storage device maintaining sheets of media and providing said sheets of media to said media path, said media path being positioned to supply sheets of media to printing elements of said printing apparatus;

evaluating said media path faults to determine a severity of said media path faults using said processor device;

providing a user-selectable bypass option to perform a bypass operation based on at least one of said media path faults exceeding a previously established severity level, said user-selectable bypass option being provided on a graphic user interface of said printing apparatus; and performing said bypass operation using said processor device based on a combination of said at least one of said media path faults exceeding a previously established severity level and said user-selectable bypass option being selected.

20. The method according to claim 19, said bypass operation being performed only if said at least one of said media path faults exceeds said previously established severity and said user-selectable bypass option is selected.

21. The method according to claim 19, said bypass operation comprising at least one of: said graphic user interface providing user instructions; and said processor device changing a path selection within said media path.

22. The method according to claim 19, said media path faults exceeding said previously established severity level comprising media path faults correctable by at least one of: a permanent component of said printing apparatus being replaced; and action by a trained service individual.

23. The method according to claim 19, said media path faults not exceeding said previously established severity level comprising media path faults correctable by at least one of: a consumable component of said printing apparatus being replaced; and action by an untrained user.

24. The method according to claim 19, said printing elements placing marks on said sheets of media.

* * * * *